Figure 1:
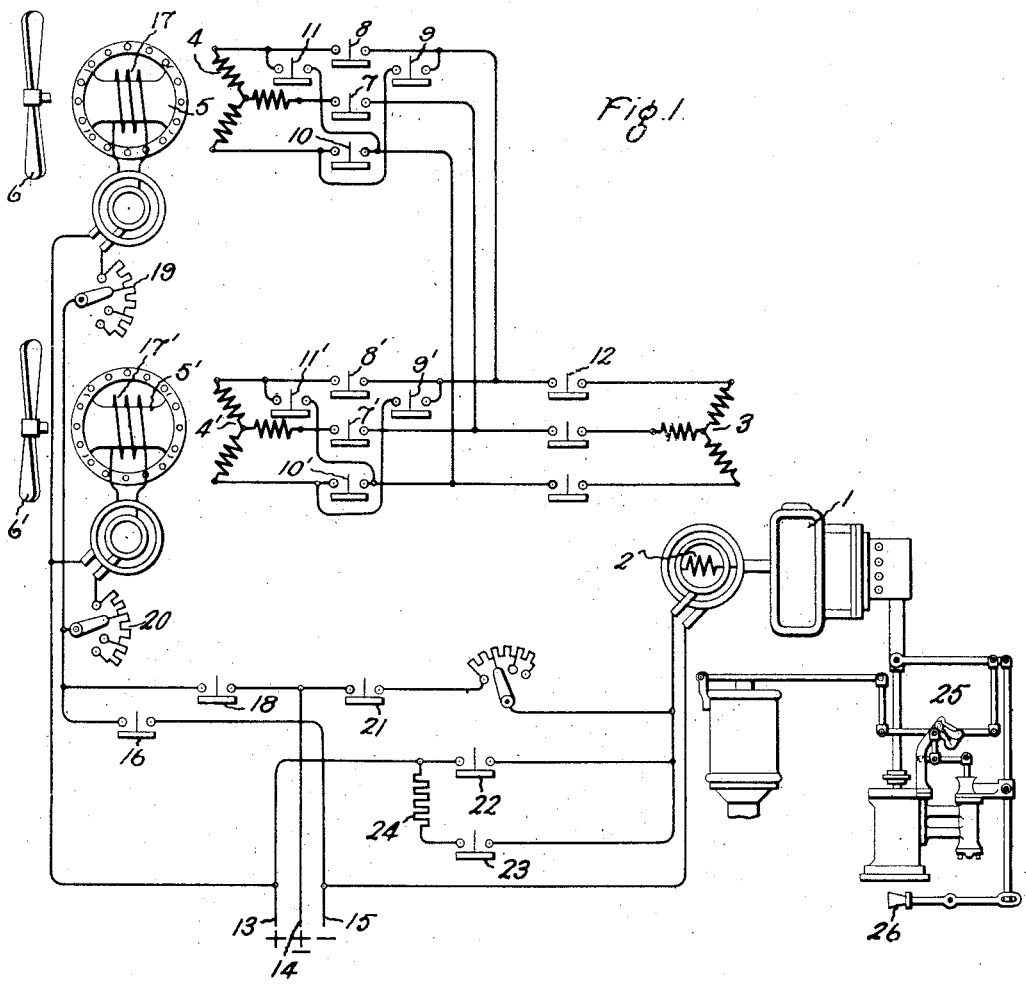

Jan. 29, 1924

E. F. W. ALEXANDERSON

ELECTRIC SHIP PROPULSION 1,481,853

Original Filed Feb. 16, 1920    2 Sheets-Sheet 1

Inventor:
Ernst F. W. Alexanderson,
by Albert G. Davis
His Attorney

Jan. 29, 1924.
E. F. W. ALEXANDERSON
1,481,853
ELECTRIC SHIP PROPULSION
Original Filed Feb. 16, 1920    2 Sheets-Sheet 2
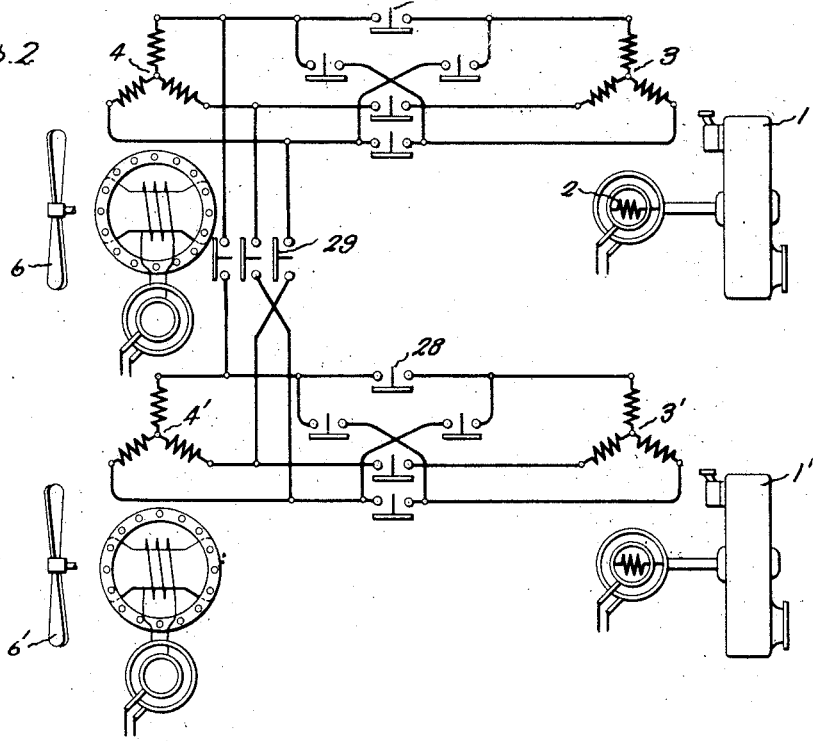
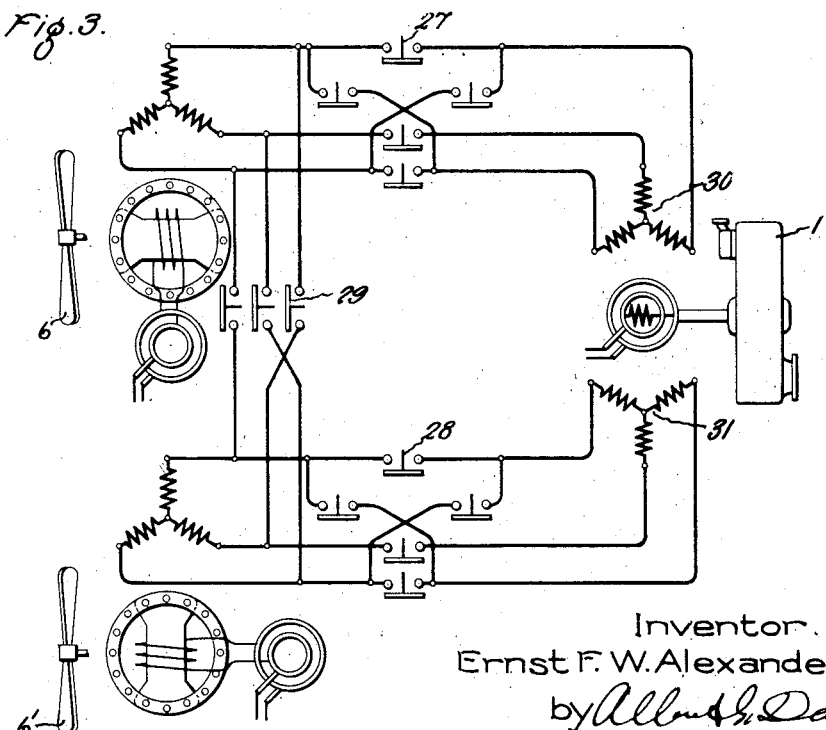
Inventor.
Ernst F. W. Alexanderson
by Albert G. Davis
His Attorney

Patented Jan. 29, 1924.

1,481,853

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

ELECTRIC SHIP PROPULSION.

Original application filed February 16, 1920, Serial No. 358,973. Divided and this application filed September 12, 1921. Serial No. 500,025.

*To all whom it may concern:*

Be it known that I, ERNST F. W. ALEXANDERSON, a citizen of the United States, residing at Schenectady, in the county of Schenectady, State of New York, have invented certain new and useful Improvements in Electric Ship Propulsion, of which the following is a specification.

My invention relates to electric power systems and particularly to systems of electric ship propulsion wherein a plurality of propellers are used and one or more motors arranged to drive each propeller shaft.

An object of my invention is to provide a system of electric ship propulsion for plural propeller ships particularly adapted to the use of motors, adapted to operate as synchronous motors and particularly adapted to provide the torque necessary to break the propellers from the water and reverse them.

A further object of my invention is to provide a method of operation which will enable the motors to give a strong dynamic braking action to break the propellers from the water.

My invention will be better understood from the following description taken in connection with the accompanying drawings and its scope will be pointed out in the appended claims.

The requirements that must be met in electric ship propulsion equipments of general utility are unfavorable to induction motor design because of the low propeller speeds encountered. Considerations of efficiency and economy usually require a high speed turbine generator and even though a bi-polar generator be used the frequency of the generator output will frequently require a propeller motor having from 60 to 80 poles. An induction motor designed to meet the conditions imposed will have a very low power factor or a dangerously small air gap whereas the synchronous motor can be not only lighter but better in these respects. Difficulties lie in the way of using propeller driving motors of the synchronous type, however, for the reason that the synchronous motor characteristics are such that its starting and reversing torques are relatively small even when the motor is provided with some well known form of squirrel cage winding. The requirements that a ship propulsion motor must fulfill in order to be adapted to the characteristics of the propeller during the various maneuvering operations have been determined experimentally. The results indicate that the momentum of the ship dragging the propeller through the water causes the propeller to be driven with considerable power by the water as a turbine and that it can not be stopped unless a torque nearly equal to the full load torque of the motor is exerted to break the propeller away from the water. This maximum torque occurs at a speed of about 35%. After this point has been passed the propeller can easily be stopped and can be held at standstill by breaking of only 40% of full load torque. If quick stopping of the ship is to be effected it is not only necessary to stop the propeller but it must be revolved in the opposite direction. Full load motor torque in the reversed direction is required to revolve the propeller at 33% speed backwards. In order to design a motor to meet the requirements for quick maneuvering and reversal of the propeller it is obviously necessary to have a motor which cannot only deliver a considerable driving torque to the propeller when it rotates in the reverse direction but which also has a braking effect as high as full load driving torque in order to stop the propeller before it can be reversed.

According to my invention I use a propeller driving motor having both synchronous and induction motor characteristics and develop the torque necessary to break the propeller from the water and bring it approximately to standstill by using the motor as an electric brake on the propeller.

In my application, Serial No. 358,973, filed Feb. 16, 1920, for electric ship propulsion, of which application the present application is a division, I have disclosed and claimed broadly methods and apparatus for utilizing to advantage motors adapted to operate either as induction motors or synchronous motors. According to the embodiment of my invention disclosed in the present application the propellers may be electrically braked in several different ways and the system is particularly adapted to secure an efficient braking action by connecting the propeller motors together with reversed phase rotation and exciting them so that each motor acts as a braking generator circulating its current through the windings of the other motor so that the motors tend to buck or stop each other. According to the modification of the invention disclosed in the present application when the motors have been brought practically to standstill the reversal of the direction of rotation is secured by operating the motors as induction motors. During this phase of operation the motors will be unexcited and the generators preferably over-excited to give a strong induction motor torque. According to this method of operation the propeller driving motors are first bucked against each other to break the propellers from the water and bring them approximately to standstill, then operated as induction motors to reverse the propellers until synchronism has been substantially reached in the reversed direction, at which time the motors are again excited for normal synchronous operation.

Referring to the accompanying drawings Fig. 1 is a diagrammatic representation of a system comprising two propeller driving motors supplied from a single generator with connections whereby the motors may be interconnected for electric braking; Fig. 2 shows a modified form of system in which a plurality of generators and motors are used; and Fig. 3 shows a system in which a plurality of motors are supplied from independent windings on a single generator.

Referring to Fig. 1 an elastic fluid turbine 1 is arranged to drive directly the revolving field 2 of a synchronous generator whose stator 3 is adapted to be connected to the stators 4 and 4′ of propeller driving motors whose rotors 5 and 5′ are respectively connected to the propellers 6 and 6′. Circuit controlling and reversing contactors 7, 8, 9, 10 and 11 are provided in the connections leading to the stator winding 4 and similar circuit controlling and reversing switches 7′, 8′, 9′, 10′ and 11′ are provided in the connections leading to the stator winding 4′. A disconnecting switch 12 is provided between the generator stator winding 3 and the stator windings 4 and 4′. In the arrangement shown a three-wire system is used for exciting the field windings of the generator and motor and such a system is particularly well adapted for carrying out my method of operation for the reason that the field windings may be readily excited either independently or together with normal or double voltage. The mains of the three-wire system are represented by the lines 13, 14 and 15. A switch 16 is arranged to connect the motor field windings 17 and 17′ across lines 13 and 15 for overexcitation. The rotors of the motors are provided with high resistance squirrel cage windings in addition to the exciting windings. A switch 18 is arranged to connect the motor field windings across the lines 13 and 14 for normal excitation. Adjustable resistors 19 and 20 may be provided for independently adjusting the excitation of the motor field windings to control the action during breaking and the power factor of each motor during normal operation. A switch 21 is arranged to connect the generator field winding 2 across the lines 14 and 15 for normal excitation of the generator and a switch 22 is arranged to connect the generator field winding across the lines 13 and 15 for over-excitation. A switch 23 in circuit with a resistor 24 is provided for enabling the transition to be made from over-excitation to normal excitation on the generator without short circuiting one side of the three-wire system. The turbine is represented as provided with a speed governing mechanism 25 for automatically maintaining any approximate speed which may be desired whether the turbine is loaded or unloaded. A speed adjusting lever 26 is provided whereby the governing mechanism may be adjusted to hold any desired speed. The governing mechanism indicated in the drawing is of the type represented in the United States patent to Emmet, No. 1,137,308, dated April 27, 1915. It is to be understood, however, that my invention is not limited in any respect to any particular construction or type of governing mechanism for the turbine.

The arrangement of switches shown in Fig. 1 permits of operating the propeller driving motors either individually or together and makes it possible to operate one motor in one direction and the other motor in the other direction if desired. Where but one motor is to be used the field circuit of the other motor will be interrupted. The system as described is capable of being operated in a manner claimed in my application, Serial No. 358,973, heretofore referred to. According to such method of operation either or both motors may be connected to the generator with reversed phase rotation for synchronous braking. To explain this method and to simplify the description let it be assumed that but one of the propellers, for example, propeller 6 is being driven. For normal synchronous operation disconnecting switch 12 will be closed as well as contactors 7, 8 and 10. Switches 18 and 21 will be closed, thus putting normal excitation on the generator and motor field windings 2 and 17 respectively. If it now be desired to reverse the direction of the ship, switches 18 and 21 will be opened to deenergize the motor and generator field windings. Switches 7, 8 and 10 will then be opened and switches 7, 9 and 11 closed thus reversing the phase rotation between generator and motor. It will be noted that the manipulation of the line contactors 7, 8, 9, 10 and 11 is thus performed while the circuits are dead with advantages well known in the art. Exciting current is now again supplied to the field winding of the motor to cause the motor to operate as a generator driven by the propeller 6, the braking energy developed in the motor being dissipated largely in the solid field cores of the generator rotating field element by the eddy currents developed therein. In addition to this energy dissipation, energy is dissipated in the motor and generator windings. In order to secure a very powerful synchronous braking torque, over-excitation is applied to the motor field winding during this phase of the operation and this is secured by closing the switch 16 thus connecting the motor field winding across the outside lines 13, 15 of the three-wire system. During this phase of operation the speed of the turbine will be reduced by adjusting the governor lever 26 to reduce the turbine speed to about one-quarter normal speed.

In a practical embodiment of the invention the circuit controlling switches and contactors will preferably be remotely controlled through an electric controller and the speed controlling mechanisms for the turbine will preferably be interlocked with the circuit controlling mechanism so that maneuvering operations can be accomplished only when the speed of the turbine has first been reduced. When the controller has been brought practically to standstill by the synchronous braking action, the switch 22 will be closed to apply over-excitation to the generator field winding 2. When the generator excitation has built up, switch 16 will be opened to remove the excitation from the motor. A strong induction motor action will now be produced to reverse the propeller and bring it up to speed in the reverse direction. When synchronism has been nearly reached switch 18 will be closed to restore normal excitation to the motor to bring it into step with the generator for normal synchronous operation. After an interval of time sufficient for the motor field current to be established switch 23 will be closed, switch 22 opened and switch 21 closed. As soon as switch 23 is closed excitation is maintained on the generator even though the switch 22 be opened by reason of the fact that the generator field circuit is completed through resistor 24. The resistor 24 is provided to prevent short circuiting the exciting system during the transition from over-excitation to normal excitation of the generator. This short circuit would exist from line 13 through switches 22 and 21 to line 14. The system is now operating in the reverse direction with normal excitation on motor and generator and the speed of the turbine may be adjusted for any desired speed of the ship. It is obvious that the same method of operation may be carried out with both of the motors arranged to supply braking currents through the generator field windings. The method of braking a single motor just described is covered in my application Serial No. 358,973, heretofore referred to. The system of Fig. 1, however, enables the propeller driving motors to be connected together independently of the generator for synchronous braking. In this way each machine works upon a machine of identical constants giving very efficient braking torque. To secure this braking action the disconnecting switch 12 will be opened and contactors 7, 8, 9, 10 and 11 reversed with respect to contactors 7', 8', 9', 10' and 11'. The stator windings 4 and 4' are thus connected together with reversed phase rotation. Braking torque will be developed in each motor from three causes: (1) passing the short circuit current through the windings of the machine generating the current, (2) passing the same current through the windings of the other machine, (3) induction motor torque by currents generated by the second machine reacting upon the rotor of the first machine. The propellers are thus quickly brought to standstill. The reversing contactors for stator 4' will now be reversed and disconnecting switch 12 closed. The excitation circuits will have been manipulated as heretofore described to apply over-excitation to the generator field winding and the two propellers 6 and 6' will now be reversed and accelerated in the reverse direction.

The modification shown in Fig. 2 differs from that shown in Fig. 1 in that a plurality of generators and turbines are used. The second turbine and stator windings are represented by 1' and 3'. The circuit controlling and reversing contactors between stator windings 3 and 4 are indicated at 27 and the corresponding contactors between stator windings 3' and 4' are indicated at 28. A switch 29 is arranged to interconnect stator windings 4 and 4' and this switch is arranged to produce reversed phase rotation between these machines. The details of the excitation circuits are not shown for the reason that the description heretofore given renders it obvious how these field windings may be excited. In this connection it may be noted that where two motors are supplied from a single generator the required braking torque can be developed by bucking the motors with less over-excitation in the motors than would be required if the motors were connected to the generator for reversed phase braking.

The operation of the modification shown in Fig. 2 is as follows:—Assuming that the ship is proceeding at full speed and that it is desired to initiate synchronous braking, the switches 27 and 28 are reversed and switch 29 closed. In this way each motor is in reversed phase rotation with respect to its generator and the two motors are relatively in the opposite phase rotation. Furthermore the two generators are connected together with opposite phase rotation. The result is that the two motors tend to stop each other and that the generators tend to stop each other. It is apparent that the arrangement shown in Fig. 2 may, if desired, be operated to produce synchronous braking by merely closing the switch 29 and leaving switches 27 and 28 open.

The arrangement shown in Fig. 3 represents a further modification showing the propeller driving motors interconnected for synchronous braking. In this case the generator is provided with independent stator windings 30 and 31. Reversing switches 27 and 28 and cross-connecting switch 29 are arranged as in Fig. 2. The operation of this modification is believed to be obvious without further description.

While my invention is peculiarly adapted to utilize the advantages of a salient pole synchronous motor, it is apparent that I have disclosed features of construction and methods of operation not limited to any particular construction of synchronous motors.

I have herein shown and particularly described certain embodiments of my invention and certain methods of operation embraced therein for the purpose of explaining its principle and showing its application but it will be obvious to those skilled in the art that many modifications and variations are possible and I aim, therefore, to cover all such modifications and variations as fall within the scope of my invention which is defined in the appended claims.

What I claim as new and desire to secure by Letters Patent of the United States, is:—

1. An electric ship propulsion system comprising a plurality of propellers and a synchronous motor arranged to drive each propeller, characterized by the fact that connections are provided whereby the motors may be connected together with reversed phase rotation and excited to operate as generators to break the propellers from the water and bring them to standstill.

2. The method of operating an electric power system comprising a plurality of work motors having both synchronous and induction motor characteristics, which motors are adapted to be driven to operate as generators, which comprises connecting the motors together with reversed phase rotation and exciting them to buck one motor against another.

3. The method of operating a ship propulsion system comprising a plurality of generators and a plurality of propellers having a driving motor on each propeller shaft which motors have both synchronous and induction motor characteristics, which comprises connecting the motors and generators together so that the motors are in reversed phase rotation with respect to each other, and so that the generators are in reversed phase rotation with respect to each other and each generator in reversed phase rotation with respect to a motor and exciting the motors while leaving the generators unexcited.

4. An electric ship propulsion system comprising a synchronous generator, a plurality of propellers each having a driving motor having both synchronous and induction motor characteristics, means for controlling the excitation circuits of said generators and motors, and means arranged to be operated to connect the motors together with reversed phase rotation, whereby the motors may be operated as braking generators to break the propeller from the water.

5. An electric ship propulsion system comprising a plurality of generators and a plurality of propellers each having a driving motor having both synchronous and induction motor characteristics, and switching means arranged to be operated to connect the generators to supply current individually to the motors driving the respective propellers, or to connect the motors and generators together with the phase rotation of the motors reversed with respect to each other, with the phase rotation of the generators reversed with respect to each other and with the phase rotation of each motor reversed with respect to its individual generator, for braking purposes.

6. The method of operating a ship propulsion system comprising a generator and a plurality of propellers having a driving motor on each propeller shaft which motors have both synchonous and induction motor characteristics, which comprises bucking the motors against each other to break the propellers from the water, operating the motors as induction motors to reverse the propellers and then exciting the motors for synchronous operation.

In witness whereof, I have hereunto set my hand this 9th day of September, 1921.

ERNST F. W. ALEXANDERSON.